United States Patent Office 3,097,207
Patented July 9, 1963

3,097,207
1-HALOPHENYL AND 1-ALKOXYPHENYL CYCLOHEXYLAMINES
V. Harold Maddox, Huntington Woods, and Erik F. Godefroi, Harper Woods, Mich., assignors to Parke, Davis & Company, Detroit, Mich., a corporation of Michigan
No Drawing. Filed Mar. 6, 1958, Ser. No. 719,500
10 Claims. (Cl. 260—293)

This invention relates to new 1-(substituted-aryl)-1-cyclohexylamine compounds and their non-toxic acid-addition salts, to method for their production, and to pharmaceutical compositions containing the same.

The 1-(substituted-aryl)-1-cyclohexylamine compounds comprehended by this invention can be represented, as their free bases, by the structural formula $$\begin{array}{c} CH_2CH_2 \diagdown Ar \\ CH_2 \diagup C \diagdown \\ CH_2CH_2 \diagup NR_1R_2 \end{array}$$

In this formula, wherein the groups Ar and $NR_1R_2$ are both attached to the 1-position of the cyclohexane nucleus, Ar represents a substituted-aryl radical such as a halophenyl, (lower)alkoxyphenyl, (lower)alkylphenyl, (lower)dialkylaminophenyl or phenoxyphenyl radical; and $R_1$ and $R_2$, which can be the same or different, represent hydrogen or lower alkyl or aralkyl radicals, or are combined as an alkylene chain and together with the nitrogen atom represent a pyrrolidino, piperidino, (lower)alkylpyrrolidino or (lower)alkylpiperidino radical.

In one of the methods for the manufacture of compounds of this invention, an N-(cyclohexylidene)alkylamine or N-(cyclohexylidene)aralkylamine of the formula $$\begin{array}{c} NR_3 \\ \| \\ \bigcirc \end{array}$$

wherein $R_3$ is a lower alkyl or aralkyl groups is reacted with an alkali metal compound of the formula $$Ar—M$$

wherein Ar is a halophenyl, (lower)alkoxyphenyl, (lower)alkylphenyl, (lower)dialkylaminophenyl or phenoxyphenyl radical and M is an alkali metal, preferably lithium. The initial phase of the reaction is carried out under anhydrous conditions in a non-hydroxylic solvent such as an ether or a hydrocarbon; and upon treatment of this reaction mixture with water to hydrolyze the product, the compound obtained is the secondary amine of the formula $$\begin{array}{c} CH_2CH_2 \diagdown Ar \\ CH_2 \diagup C \diagdown \\ CH_2CH_2 \diagup NHR_3 \end{array}$$

wherein Ar and $R_3$ are defined as before.

Primary amines of this invention can be prepared by subjecting a suitable secondary amine of the foregoing formula, particularly a secondary amine wherein $R_3$ is an aralkyl radical such as benzyl, to catalytic hydrogenation. The hydrogenation can be carried out under atmospheric or greater than atmospheric pressure, with a noble metal catalyst such as palladium on charcoal. With acidic solvents, the reaction product is conveniently isolated as an acid-addition salt; whereas with neutral solvents, the free amine is obtained directly.

Such primary amines have the formula $$\begin{array}{c} CH_2CH_2 \diagdown Ar \\ CH_2 \diagup C \diagdown \\ CH_2CH_2 \diagup NH_2 \end{array}$$

wherein Ar is defined as before.

In another embodiment of this invention, secondary and tertiary amines of the formula $$\begin{array}{c} CH_2CH_2 \diagdown Ar \\ CH_2 \diagup C \diagdown (lower)alkyl \\ CH_2CH_2 \diagup N \diagdown \\ H \text{ (or lower alkyl)} \end{array}$$

wherein Ar is defined as before, are produced by the alkylation of the primary and secondary amines previously described. The alkylation can be carried out using such means as reaction with an alkyl halide, dialkyl sulfate, or a mixture of formaldehyde and formic acid. The alkylation can also be carried out in a step-wise fashion by first acylating the primary or secondary amine with a carboxylic acid anhydride or halide and reducing the carbonyl group in the amido compound so obtained. The reduction is preferably carried out using a hydride such as lithium aluminum hydride. The alkylation to monoalkylamino compounds can also be achieved by reductive alkylation of the primary amino compounds. Such a reductive alkylation can be carried out by reacting the primary amino compound with an aldehyde or ketone and subjecting the reaction mixture to catalytic hydrogenation.

In a further embodiment of this invention, amines of the formula $$\begin{array}{c} CH_2CH_2 \diagdown Ar \\ CH_2 \diagup C \diagdown \\ CH_2CH_2 \diagup NR_4R_5 \end{array}$$

are produced by the reaction of arylmagnesium halides of the formula $$Ar—MgX$$

with a cyclohexanecarbonitrile compound of the formula $$\begin{array}{c} CH_2CH_2 \diagdown CN \\ CH_2 \diagup C \diagdown \\ CH_2CH_2 \diagup NR_4R_5 \end{array}$$

In these formulas Ar is defined as before; X represents a halogen atom; and $R_4$ and $R_5$ represent lower alkyl radicals or are combined as an alkylene chain and together with the amino nitrogen atom represent a pyrrolidino, piperidino, (lower)alkylpyrrolidino or (lower)alkylpiperidino radical. The initial phase of the reaction is carried out under anhydrous conditions in a non-hydroxylic solvent such as an ether or hydrocarbon, and the desired product is isolated after hydrolysis of the reaction mixture with water, aqueous mineral acid, or other aqueous media such as solutions of ammonium chloride and ammonium hydroxide. For best results, it is preferred to use either approximately equivalent amounts of the reactants or up to a 20% excess of the arylmagnesium halide.

In the applications of this invention, the compounds can be employed as free bases or in the form of non-toxic acid-addition salts formed by admixture with a variety of inorganic and organic acids. Among such acids are hydrochloric, hydrobromic, hydroiodic, sulfuric, acetic, benzoic, citric, maleic, malic, gluconic, ascorbic and related acids.

The compounds of this invention have pharmacologically useful effects upon the central nervous systems, and are of particular value for their depressant and anti-convulsive actions. When constituted into dosage forms by incorporation with pharmaceutically-acceptable solid or liquid carriers or diluents, they are useful as anesthetics exhibiting a lack of undesirable side-effects such as respiratory depression, as adjuncts in anesthesia, in the treatment of hyper-excitability, in the production of tranquilization, and as anti-convulsive agents. The dosage forms into which these agents can be incorporated include tablets, liquid and dry filled capsules, aqueous and non-aqueous solutions for oral and parenteral administration, dragees, suppositories for rectal administration and inhalants, jellies and sprays for nasal administration. Some examples of carriers and diluents which can be incorporated in such compositions are sugars such as lactose and sucrose; cellulose derivatives such as sodium carboxymethyl cellulose, ethyl cellulose, methyl cellulose and cellulose acetate phthalate; gelatin; talc; magnesium stearate; vegetable oils such as peanut oil, cottonseed oil, sesame oil, olive oil, corn oil and oil of theobroma; liquid petrolatum; polyethylene glycol; glycerine; sorbitol; propylene glycol; ethanol; agar; water and isotonic saline. Suitable preservatives and flavoring agents can also be incorporated in such compositions.

These pharmaceutical compositions are formulated to contain therapeutic amounts of the active agent, which varies according to the route of administration, the subject treated, and the pharmacological effect desired. Oral doses of less than 1 mg./kg. are capable of producing mild euphoria, whereas larger oral and parenteral doses, produce increasing catalepsy and anesthesia.

The invention is illustrated by the following examples:

*Example 1*

Cyclohexanone (196 g.) and anhydrous ethylamine (100 g.) are chilled separately to about 5° C. and then poured together. The mixture is cooled in an ice bath until the reaction is no longer exothermic and then allowed to stand at 5° C. for 16 hours. Solid potassium hydroxide (100 g.) is added and, after the mixture is shaken thoroughly, the organic phase is separated by decantation, filtered and distilled to give N-(cyclohexylidene)ethylamine, B.P. 64-67° C. at 20 mm.

By the foregoing procedure, with the substitution of an equivalent amount of benzylamine for the ethylamine, the compound obtained is N-(cyclohexylidene)benzylamine.

A solution of p-tolyllithium prepared from 18.2 g. of lithium and 148 ml. of p-bromotoluene in 800 ml. of anhydrous ether is treated with 87 g. of N-(cyclohexylidene)ethylamine in 100 ml. of ether. The reaction mixture is stirred for two hours at room temperature and then decomposed with water. The ethereal solution is washed twice with water, dried over anhydrous magnesium sulfate and brought to dryness by evaporation. The residue is distilled at 0.1 mm. The desired N-ethyl-1-(p-tolyl)cyclohexylamine is collected as a distillate boiling at about 134–135° C.

The hydrochloride is prepared by treating an ethereal solution of the free base with about 1 equivalent of methanolic hydrogen chloride and collecting the insoluble product on a filter. The hydrochloride melts at about 209–210° C. By substitution of one equivalent of hydrogen bromide for the hydrogen chloride, the compound obtained is the ether-insoluble hydrobromide.

*Example 2*

A solution of o-tolyllithium prepared from 18.2 g. of lithium and 148 ml. of o-bromotoluene in 800 ml. of ether is treated with a solution of 87 g. of N-(cyclohexylidene)ethylamine in 100 ml. of ether. The mixture is stirred for two hours and then decomposed with water. The ethereal solution is washed twice with water, rendered anhydrous over magnesium sulfate and brought to dryness by evaporation. By distillation of the residue at 0.15 mm. there is obtained N-ethyl-1-(o-tolyl)cyclohexylamine boiling at about 121–125° C. The hydrochloride, prepared by treatment of the free base with methanolic hydrogen chloride as in Example 1, melts at about 223–224° C.

*Example 3*

To a solution of m-tolyllithium prepared from 8.5 g. of lithium and 100 g. of m-bromotoluene in 500 ml. of ether is added 44 g. of N-(cyclohexylidene)ethylamine in 100 ml. of ether. The reaction mixture is stirred for two hours at room temperature and then decomposed with water. The ethereal solution is washed with two portions of water, rendered anhydrous, and brought to dryness by evaporation. Distillation of the residue under reduced pressure affords N-ethyl-1-(m-tolyl)cyclohexylamine, B.P. about 150–152° C. at 0.2 mm. The hydrochloride, prepared from the free base and methanolic hydrogen chloride as in Example 1, melts at about 236–237° C.

*Example 4*

To a solution of butyllithium prepared at −10° C. from 18.2 g. of lithium and 118 ml. of butyl bromide in 100 ml. of anhydrous ether is added a solution of 192 g. of p-bromochlorobenzene in 600 ml. of ether. The reaction mixture is stirred for 15 minutes to effect conversion to p-chlorophenyllithium and then 93 g. of N-(cyclohexylidene)ethylamine in 200 ml. of ether is added. The reaction mixture is stirred for two hours and then decomposed with water. The ethereal solution is washed with water, rendered anhydrous with magnesium sulfate and brought to dryness by evaporation. By distillation of the residue in a vacuum, there is obtained N-ethyl-1-(p-chlorophenyl)cyclohexylamine as a distillate boiling at about 111–113° C. at 0.2 mm. The hydrochloride, prepared by treatment of an ethereal solution of the free base with one equivalent of methanolic hydrogen chloride, melts at about 259–260° C.

*Example 5*

To a solution of butyllithium prepared from 9 g. of lithium and 69 g. of butyl bromide in 500 ml. of ether is added 100 g. of m-bromochlorobenzene. After this solution is stirred for 15 minutes, 50 g. of N-(cyclohexylidene)ethylamine in 100 ml. of ether is added, and stirring at room temperature is continued for two more hours. After the addition of a small amount of water, the ethereal solution is washed with water and dried. The ether is removed by evaporation and the residue is distilled in a vacuum to afford N-ethyl-1-(m-chlorophenyl)cyclohexylamine which boils at about 98–103° C., at 0.13 mm.

By treatment of an ethereal solution of the free base with methanolic hydrogen chloride, the compound obtained is the hydrochloride, M.P. about 271–271.5° C.

*Example 6*

A solution of N-butyllithium is prepared from 9 g. of lithium and 69 g. of butyl bromide in 500 ml. of ether. Unreacted lithium can be removed by rapid filtration through a glass wool plug, following which 187 g. of p-bromoanisole is added. The reaction mixture is stirred for 10 minutes and then 93 g. of N-(cyclohexylidene)ethylamine in 300 ml. of ether is added. Stirring is continued for three more hours. A small quantity of water is added and the ethereal solution is then washed with water, rendered anhydrous, and brought to dryness by evaporation. When the residue is distilled in a vacuum, there is obtained N-ethyl-1-(p-methoxyphenyl)cyclohexylamine boiling at about 90–92° C. at 0.05 mm.

Example 7

To a solution of p-diethylaminophenyllithium prepared from 6.08 g. of lithium and 50 g. of p-bromodiethylaniline in 250 ml. of anhydrous ether is added 25 g. of N-(cyclohexylidene)ethylamine in 200 ml. of ether. After a two-hour reflux period, the cooled reaction mixture is hydrolyzed with water and the ethereal layer is washed with water, rendered anhydrous over sodium sulfate and brought to dryness by volatilization of the ether. The residue is distilled at about 25 microns pressure and a fraction comprising the desired free base is collected at a distillation temperature of 122–141° C. If desired, the compound can be further purified by converting it to the hydrochloride, releasing the free base by treatment with sodium hydroxide solution, extracting the free base with ether, removing the ether by evaporation and distilling the residue under reduced pressure. In this manner there is obtained N-ethyl-1-(p-diethylaminophenyl)cyclohexylamine which boils at about 145–146° C. at 0.1 mm.

Example 8

To a solution of m-tolyllithium prepared from 14 g. of lithium and 171 g. of m-bromotoluene in 500 ml. of anhydrous ether is added a solution of N-(cyclohexylidene)benzylamine in 500 ml. of anhydrous ether, added over a period of one hour while the mixture is maintained under reflux. Heating under reflux is continued for three more hours after which the chilled reaction mixture is hydrolyzed by the addition of 300 ml. of water. The separated organic phase is combined with a 100 ml. benzene extract of the aqueous phase, dried and distilled to remove the solvents. By distillation of the residue under reduced pressure, there is obtained, following removal of a forerun of unreacted N-(cyclohexylident)benzylamine, the desired N-benzyl-1-(m-tolyl)cyclohexylamine as a distillate boiling at about 134.5–140° C. at 0.12–0.10 mm. This compound exhibits a refractive index, $n_D^{25}$, of about 1.5657 and ultraviolet absorption maxima at about 251, 273 and 285 millimicrons.

Example 9

A mixture of 21.7 g. of N-ethyl-1-(p-tolyl)cyclohexylamine, 100 ml. of benzene and 10 ml. of acetic anhydride is allowed to stand at room temperature for eighteen hours. The reaction mixture is washed with water and the benzene solution is evaporated. The residual oil is dissolved in 50 ml. of anhydrous ether and the solution added slowly to 10 g. of lithium aluminum hydride in 800 ml. of ether. The reaction mixture is stirred for sixteen hours and then decomposed with water, washed with sodium hydroxide solution and with water, filtered and dried. An excess of isopropanolic hydrogen chloride is added and the precipitate is removed by filtration and recrystallized from a mixture of methanol and ether to give N,N-diethyl-1-(p-tolyl)cyclohexylamine hydrochloride, M.P. 170–171° C.

Example 10

A mixture of 22.5 g. of N-ethyl-1-(p-chlorophenyl)cyclohexylamine, 100 ml. of benzene and 10 ml. of acetic anhydride is allowed to stand at room temperature for three days. The benzene solution is washed with water and dilute hydrochloric acid and then dried. The dried solution is added to 10 g. of lithium aluminum hydride in one liter of anhydrous ether and stirred for sixteen hours. The reaction mixture is decomposed with water, washed with sodium hydroxide solution and with water, filtered and evaporated. The residue is distilled in vacuo to give N,N-diethyl-1- (p-chlorophenyl)cyclohexylamine, B.P. 102–112° C. at 0.1 mm. This free base in ether is converted to the hydrochloride with isopropanolic hydrogen chloride and the precipitate is recrystallized from a mixture of methanol and ether to give N,N-diethyl-1-(p-chlorophenyl)cyclohexylamine hydrochloride, M.P. 177–179° C.

Example 11

A mixture of 10.8 g. of N-ethyl-1-(m-tolyl)cyclohexylamine, 4.15 ml. of formic acid and 4.35 g. of 38% formaldehyde is warmed on a steam bath for several hours until the carbon dioxide ceases to be evolved. The reaction mixture is cooled, made basic with 25 ml. of 5-normal sodium hydroxide solution and extracted several times with ether. The ethereal solutions are combined, dried and evaporated. The residue is distilled in vacuo to give N-methyl-N-ethyl-1-(m-tolyl)cyclohexylamine, B.P. 97–98° C. at 0.1 mm.

Example 12

A mixture of 11.7 g. of N-ethyl-1-(p-methoxyphenyl)cyclohexylamine, 4.15 ml. of formic acid and 4.35 g. of 38% formaldehyde is warmed on a steam bath for two hours. The reaction mixture is cooled, made alkaline with 25 ml. of 5-normal sodium hydroxide solution and extracted with ether. The ethereal extracts are combined, dried and evaporated. The residue is distilled in vacuo to give N-methyl-N-ethyl-1-(p-methoxyphenyl)cyclohexylamine, B.P. 102–110° C. at 0.1 mm.

Example 13

A mixture of 8.2 g. of N-ethyl-1-(o-tolyl)cyclohexylamine, 4.15 ml. of formic acid and 4.35 g. of 38% formaldehyde is warmed on a steam bath for three hours. The reaction mixture is cooled, made alkaline with 25 ml. of 5-normal sodium hydroxide solution and extracted with ether. The ether extracts are combined, dried and evaporated. The residue is distilled in vacuo to give N-methyl-N-ethyl-1-(o-tolyl)cyclohexylamine, B.P. 82–88° C. at 0.1 mm.

When an ethereal solution of the free base is treated with isopropanolic hydrogen chloride, the precipitated product is the hydrochloride which, after recrystallization, melts at about 158–160° C.

The water-soluble citrate is made by the reaction of the free base and citric acid in methanol.

Example 14

Cyclohexane carbonitrile derivatives required as starting materials in this and subsequent examples are prepared by the reaction of cyclohexanone cyanohydrin and a suitable heterocyclic amine. Thus, a mixture of 62.5 g. of cyclohexanone cyanohydrin, 50 ml. of pyrrolidine and 500 ml. of benzene is subjected to azeotropic distillation until water ceases to be evolved. The mixture is subjected to distillation in a vacuum to obtain the desired 1-pyrrolidinocyclohexanecarbonitrile, B.P. 96–98° C. at 0.2 mm.

In a similar manner, a mixture of 62.5 g. of cyclohexanone cyanohydrin, 57 g. of 3-methyl-3-ethylpyrrolidine (prepared by lithium aluminum hydride reduction of α-methyl-α-ethylsuccinimide) and 250 ml. of benzene is subjected to azeotropic distillation until water ceases to be evolved. The mixture is subjected to distillation in a vacuum to obtain the desired 1-(3-methyl-3-ethylpyrrolidino)cyclohexanecarbonitrile, B.P. 116° C. at 0.39 mm.

By the substitution of equivalent quantities of 3-methylpiperidine, 4-methylpiperidine and piperidine in the foregoing procedure, the products obtained are respectively 1-(3-methylpiperidino)cyclohexanecarbonitrile, B.P. 110–113° C. at 0.16 mm.; 1-(4-methylpiperidino)cyclohexanecarbonitrile, B.P. 116–118° C. at 0.35 mm.; and 1-piperidinocyclohexanecarbonitrile.

To a solution of o-chlorophenylmagnesium iodide, prepared from 10.2 g. of magnesium and 100 g. of 1-chloro-2-iodobenzene in 550 ml. of anhydrous ether, is added over a 30-minute period a solution of 53.6 g. of 1-piperidinocyclohexanecarbonitrile in 250 ml. of benzene. The reaction mixture is heated under reflux for one hour and, after chilling, is stirred with 25 ml. of water and then a solution of 67 g. of ammonium chloride in 170 ml. of water. The separated organic phase is combined with a benzene extract of the aqueous phase and after removal of the solvents the residue is distilled in a vacuum. After removal of a forerun of unreacted carbonitrile the desired free base is obtained as a fraction boiling over a range from 101–117° C. at 0.125–0.05 mm. Further purification by conversion to the hydrochloride, reformation of the free base and redistillation affords 1-[1-(o-chlorophenyl)cyclohexyl]piperidine; B.P. about 145° C. at 0.55 mm., $n_D^{25} = 1.5612$.

By the foregoing procedure, with the substitution for the 1-piperidinocyclohexanecarbonitrile of equivalent quantities of each of 1-pyrrolidinocyclohexanecarbonitrile, 1-(3-methyl-3-ethylpyrrolidino)cyclohexanecarbonitrile, 1-(3-methylpiperidino)cyclohexanecarbonitrile, and 1-(4-methylpiperidino)cyclohexanecarbonitrile, the compounds obtained are respectively 1-[1-(o-chlorophenyl)cyclohexyl]-pyrrolidine, 1-[1-(o-chlorophenyl)cyclohexyl]-3-methyl-3-ethylpyrrolidine, 1-[1-(o-chlorophenyl)cyclohexyl]-3-methylpiperidine and 1-[1-(o-chlorophenyl)cyclohexyl]-4-methylpiperidine.

Example 15

To refluxing solution of p-tolylmagnesium bromide, prepared from 12.15 g. of magnesium and 85.5 g. of p-bromotoluene in 1100 ml. of ether, is added over a period of 15 minutes a solution of 38.4 g. of 1-piperidinocyclohexanecarbonitrile in 300 ml. of benzene. Heating under reflux is continued for two more hours and then the cooled gelatinous mixture is stirred with 100 ml. of water and then with a solution of 53.5 g. of ammonium chloride in 300 ml. of water. Combination of the separated organic phase with a benzene extract of the aqueous phase, followed by removal of the solvents and distillation of the residue in a vacuum affords 1-[1-(p-tolyl)cyclohexyl]piperidine boiling at about 117–122° C. at 0.26–0.20 mm. The hydrochloride, M.P. about 136–137° C., is obtained by treating an ethereal solution of the free base with methanolic hydrogen chloride.

Example 16

A solution of m-chlorophenylmagnesium iodide, prepared from 6.08 g. of magnesium and 59.6 g. of 1-chloro-3-iodobenzene in 550 ml. of ether, is treated over a 20-minute period by the addition of 19.2 g. of 1-piperidinocyclohexanecarbonitrile in 150 ml. of benzene. After the addition has been completed, the mixture is heated under reflux for two hours, cooled and hydrolyzed by the addition of 100 ml. of water followed by 250 ml. of 3-normal hydrochloric acid. This mixture is heated under reflux for three hours, cooled and filtered in order to collect the precipitated yellow 1-[1-(m-chlorophenyl)cyclohexyl]piperidine hydroiodide, M.P. about 220–223° C. For isolation of the free base, the organic phase of the filtrate is combined with an ether extract of the aqueous phase. The organic phase is saturated with hydrogen chloride and extracted with water. The aqueous extract, to which, if desired, the previously obtained hydroiodide is added, is made basic with sodium hydroxide, and the released free base is extracted with ether and recovered by evaporation of the ether. In this manner there is obtained 1-[1-(m-chlorophenyl)cyclohexyl]piperidine which after recrystallization from ethanol melts at about 89.5–91° C.

The hydrochloride, M.P. 222–224° C., is prepared by treating a solution of the free base in benzene and ether with hydrogen chloride and recrystallizing the precipitated product from a mixture of chlorobenzene and ether.

Example 17

Magnesium (7.3 g.) covered with 50 ml. of ether is treated over a 45-minute period by the addition of a solution of 56 g. of p-bromoanisole in 250 ml. of ether. The mixture is maintained under reflux during the period of addition and for one hour thereafter. To the resulting solution of p-methoxyphenylmagnesium bromide is added a solution of 19.2 g. of 1-piperidino-cyclohexanecarbonitrile in 130 ml. of benzene. About 150 ml. of ether is slowly removed by distillation and replaced with an equal volume of benzene. The mixture is then heated under reflux for one hour, chilled, hydrolyzed with 300 ml. of 3-normal hydrochloric acid, made basic with sodium hydroxide, and filtered. The filtrate is combined with benzene washings and the separated organic base concentrated under reduced pressure for removal of the solvents. An ethereal solution of the residual oil is treated with hydrogen chloride and the precipitated product is collected and recrystallized from a mixture of methanol and ether to afford 1-[1-(p-methoxyphenyl)cyclohexyl]piperidine hydrochloride melting at about 186–187° C.

Example 18

Over a period of about one hour, a solution of 187 g. of o-bromoanisole in 700 ml. of ether is added to a stirred suspension of 24.3 g. of magnesium and 100 ml. of ether. The reaction mixture is maintained under reflux during the period of addition and for 3 hours thereafter. A solution of 77 g. of 1-piperidinocyclohexanecarbonitrile in 400 ml. of benzene is added over a ½-hour period and heating under reflux is continued during this addition and for one more hour. Over a period of three hours, a slow distillation is carried out until the distillation temperature reaches 60° C. The chilled mixture is then stirred with 100 ml. of water followed by a solution of 106 g. of ammonium chloride in 250 ml. of water, and filtered in order to remove the inorganic precipitate. The organic phase is separated from the filtrate, dried and concentrated under reduced pressure. Fractional distillation of the residue affords 1-[1-(o-methoxyphenyl)cyclohexyl]piperidine, B.P. about 141–142° C. at 0.30 mm.; upon crystallization from methanol this free base melts at 50–52° C. The hydrochloride, precipitated from ether solution by treatment with hydrogen chloride, melts at about 202–202.5° C.

Example 19

To a solution of p-phenoxyphenylmagnesium bromide, prepared from 40 g. of magnesium and 249 g. of p-bromophenyl phenyl ether in 1000 ml. of ether, is added a solution of 128 g. of 1-piperidinocyclohexanecarbonitrile in 500 ml. of isooctane. The reaction mixture, which now contains a gummy precipitate, is heated under reflux for three hours, chilled and hydrolyzed by stirring with 300 ml. of a saturated aqueous solution of ammonium chloride. The separated organic phase is combined with a 100 ml. ether extract of the aqueous phase, dried and concentrated to a small volume. The crystalline solid which separates is collected on a filter; additional crops can be obtained by further concentration of the filtrate. This compound is 1-[1-(p-phenoxyphenyl)cyclohexyl]piperidine which, after recrystallization from isooctane, melts at about 102–102.5° C.

The hydrochloride, melting point 197–199° C., is prepared by treating a solution of 59.7 g. of the free base in 750 ml. of ether with 21.6 ml. of 8.24-molar isopropanolic hydrogen chloride.

Example 20

A solution of o-tolylmagnesium bromide, prepared from 24 g. of magnesium and 171 g. of o-bromotoluene in anhydrous ether, is heated under reflux for 3 hours with 135 g. of 1-piperidino-cyclohexanecarbonitrile. The reaction mixture is decomposed by stirring it with a saturated solution of ammonium chloride containing ammonium hydroxide, and the separated ethereal phase combined with an ether extract of the aqueous phase is rendered anhydrous and brought to dryness by distillation of the ether. When the residue is fractionally distilled in a vacuum, the desired 1-[1-(o-tolyl)cyclohexyl]piperidine is obtained as a fraction boiling at about 144–146° at 1 mm.

Treatment of an ethereal solution of the free base with hydrogen chloride affords the hydrochloride which shows a transition point at 196–197° C. and melts at 237–240° C.

Example 21

A solution of m-tolylmagnesium bromide, prepared from 29 g. of magnesium and 207 g. of m-bromotoluene in 500 ml. of ether, is heated under reflux for 1½ hours and then treated with a solution of 115 g. of 1-piperidinocyclohexanecarbonitrile in 400 ml. of ether. Stirring and heating under reflux is continued for three more hours. The cooled reaction mixture is then stirred with saturated ammonium chloride solution containing ammonium hydroxide, and the ethereal phase is separated and combined with an ether extract of the aqueous phase. The combined ethereal solution is washed with water, dried over anhydrous magnesium sulfate and evaporated. Crystallization of the residue from 95% ethanol yields 1-[1-(m-tolyl(cyclohexyl]piperidine, M.P. 64–66° C.

Example 22

N-benzyl-1-(m-tolyl)cyclohexylamine (30 g.) is dissolved in 200 ml. of acetic acid and then hydrogenated at room temperature with a 20% palladium on charcoal catalyst under a pressure of 3 atmospheres of hydrogen. The catalyst is removed by filtration and the filtrate concentrated to a viscous liquid. The crude product which crystallizes is purified by further crystallizations from isopropanolether and from isopropanol. It is 1-(m-tolyl)cyclohexylamine acetate, M.P. 126–128° C. The free base is obtained by dissolving the acetate in water, making the solution basic with sodium hydroxide solution, extracting with ether and concentrating to dryness. The hydrochloride, M.P. 216–218° C., is prepared by treatment of an ethereal solution of the free base wtih hydrogen chloride.

Example 23

To a refluxing solution of p-bromophenylmagnesium iodide, prepared from 12.15 g. of magnesium, 141.5 g. of 1-bromo-4-iodobenzene and 1500 ml. of anhydrous ether, is added a solution of 96.2 g. of 1-piperidinocyclohexanecarbonitrile in 250 ml. of benzene over a two-hour period. Heating under reflux is continued for one more hour and then the cooled mixture is stirred with saturated aqueous ammonium chloride. The separated ethereal phase is filtered through charcoal, dried over magnesium sulfate and treated with hydrogen chloride. The precipitated product is fractionally crystallized from isopropanol-ether to give, first, the relatively insoluble unreacted 1-piperidinocyclohexanecarbonitrile hydrochloride, and then the relatively soluble 1-[1-p-(bromophenyl)cyclohexyl]piperidine hydrochloride. After recrystallization from methanol-ether, the latter compound melts at 133–135° C.

Example 24

N-ethyl - 1 - (m-chlorophenyl)cyclohexylamine hydrochloride (12.5 g.) is passed through a No. 60 mesh stainless steel screen and then thoroughly blended with 215 g. of milk sugar and 215 g. sucrose containing 3% starch. The mixture is granulated with 40 g. of starch paste made from 1 part of starch and 7 parts of water. The granulated mixture is dried and passed through a No. 20 screen. Then 17.5 g. of talc, 35 g. of corn starch and 1 g. of magnesium stearate are blended in and the mixture is compressed into one-fourth inch concave tablets. Yield: 5000 tablets containing 2.5 mg. of N-ethyl-1-(m-chlorophenyl)cyclohexylamine hydrochloride.

Example 25

1-[ - (p-Methoxyphenyl)cyclohexyl]piperidine hydrochloride (100 g.) is mixed with 1275 g. of starch and 125 g. of magnesium stearate. The resulting mixture is filled into hard-shell gelatin capsules each containing 150 mg. Yield: 10,000 capsules each containing 10 mg. of 1-[1 - (p-methoxyphenyl)cyclohexyl]piperidine hydrochloride.

Example 26

N-ethyl-1-(m-chlorophenyl)cyclohexylamine (50 g.) is dissolved in 4950 g. of cottonseed oil and the resulting solution used in the production of soft gelatin capsules each containing 5 mg. of N-ethyl-1-(m-chlorophenyl)cyclohexylamine. Yield: 10,000 capsules.

Example 27

N-ethyl - 1 - (m-chlorophenyl)cyclohexylamine hydrochloride (20 g.) is dissolved in 8 liters of pyrogen-free water for injection buffered to a final pH of 5.5 with a citric acid buffer. The resulting solution is filled into ampoules under sterile conditions. Each ampoule is filled to contain 1.2 ml. so that 1 ml. containing 2.5 mg. of N-ethyl-1-(m-chlorophenyl)cyclohexylamine hydrochloride can be removed.

Example 28

1-[1-(o-chlorophenyl)cyclohexyl]piperidine (25 g.) is dissolved in 10 liters of peanut oil containing 10 g. of benzyl alcohol. Under sterile conditions, the resulting solution is filled into ampoules to contain 1.2 ml. so that 1 ml. containing 2.5 mg. of 1-[1-(o-chlorophenyl)cyclohexyl]piperidine can be removed.

Example 29

N - methyl - N - ethyl - 1 - (p - methoxyphenyl)cyclohexylamine (10 g.) is blended with 1200 g. of oil of theobroma and the resulting mixture formulated into suppositories each containing 25 mg. of N-methyl-N-ethyl-1-(p-methoxyphenyl)cyclohexylamine. Yield: about 400 suppositories.

Example 30

N-ethyl - 1 - (m-chlorophenyl)cyclohexylamine hydrochloride (1.5 g.) is dissolved in 400 ml. of water, following which 200 g. of sucrose and 100 g. of sorbitol are dissolved in the resultant solution. Oil of orange (1.5 ml.) and sodium benzoate (1 g.) are then added and the solution is filtered. The filtrate is diluted to 1000 ml. with water and the filtrate is filled into bottles containing 20 ml. Each ml. of the solution contains 1.5 mg. of N-ethyl-1-(m-chlorophenyl)cyclohexylamine hydrochloride.

What is claimed is:

1. A compound of the formula $$\text{CH}_2\text{--CH}_2\text{\ \ \ \ \ }\text{chlorophenyl}$$
$$\text{CH}_2\text{\ \ \ C}$$
$$\text{CH}_2\text{--CH}_2\text{\ \ \ \ }\text{NH(lower)alkyl}$$

2. N-ethyl-1-(m-chlorophenyl)cyclohexylamine.

3. N-ethyl-1-(m-chlorophenyl)cyclohexylamine hydrochloride.

4. A compound of the formula $$\text{CH}_2\text{--CH}_2\text{\ \ \ \ \ }(\text{lower})\text{alkoxyphenyl}$$
$$\text{CH}_2\text{\ \ \ C}$$
$$\text{CH}_2\text{--CH}_2\text{\ \ \ \ }\text{NH(lower)alkyl}$$

5. A compound of the formula $$\text{CH}_2\text{--CH}_2\text{\ \ \ \ \ }\text{halophenyl}$$
$$\text{CH}_2\text{\ \ \ C}\text{\ \ \ CH}_2\text{--CH}_2$$
$$\text{CH}_2\text{--CH}_2\text{\ \ \ N}\text{\ \ \ \ }\text{CH}_2$$
$$\text{CH}_2\text{--CH}_2$$

6. 1-[1-(o-chlorophenyl)cyclohexyl]piperidine.

7. A compound of the formula $$\text{CH}_2\text{--CH}_2\text{\ \ \ \ \ }(\text{lower})\text{alkoxyphenyl}$$
$$\text{CH}_2\text{\ \ \ C}\text{\ \ \ CH}_2\text{--CH}_2$$
$$\text{CH}_2\text{--CH}_2\text{\ \ \ N}\text{\ \ \ \ }\text{CH}_2$$
$$\text{CH}_2\text{--CH}_2$$

8. 1-[1-(p-methoxyphenyl)cyclohexyl]piperidine.
9. A compound of the formula

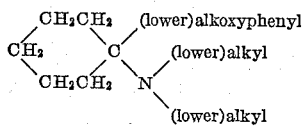

10. N-methyl-N-ethyl-1-(p-methoxyphenyl)-cyclohexylamine.

References Cited in the file of this patent

UNITED STATES PATENTS

| | | |
|---|---|---|
| 2,192,927 | Morrill | Mar. 12, 1940 |
| 2,711,428 | Goodson | June 21, 1955 |
| 2,916,490 | Schenck et al. | Dec. 8, 1959 |
| 2,921,076 | Parcell | Jan. 12, 1960 |

OTHER REFERENCES

Kurssanow, Chemische Central-Blatt, Johrg (1907), page 1744.

Braun, Berichte Deutsche Chemische, Gesellshaft (1916), page 2623.

Braun, Berichte Deutsche Chemische, Gesellshaft 1923), page 1571.

Karrer, Organic Chemistry, 2nd edition, Elsevier Pub. Co., New York (1946), page 125.

Kharasch et al.: Grignard Reactions of Nonmetallic Substances (textbook), 1954 edition, page 778, New York, Prentice Hall, Inc.

Takahashi et al.: Chemical Abstracts, volume 52, page 10911c (1958).